United States Patent
Schumacher

(10) Patent No.: US 10,060,814 B2
(45) Date of Patent: Aug. 28, 2018

(54) FLUID FILLED ELONGATE PRESSURE SENSOR

(71) Applicant: Rosemount Inc., Shakopee, MN (US)

(72) Inventor: Mark Stephen Schumacher, Minneapolis, MN (US)

(73) Assignee: ROSEMOUNT INC., Shakopee, MN (US)

( * ) Notice: Subject to any disclaimer, the term of this patent is extended or adjusted under 35 U.S.C. 154(b) by 162 days.

(21) Appl. No.: 15/070,318

(22) Filed: Mar. 15, 2016

(65) Prior Publication Data
US 2017/0268949 A1  Sep. 21, 2017

(51) Int. Cl.
*G01L 9/04* (2006.01)
*G01L 9/00* (2006.01)
*G01B 7/16* (2006.01)

(52) U.S. Cl.
CPC .............. *G01L 9/0051* (2013.01); *G01B 7/18* (2013.01)

(58) Field of Classification Search
CPC ... G01L 9/0051; G01L 9/0002; G01L 9/0057; G01L 9/0026; G01L 9/008; G01L 9/0084; G01L 13/025; G01L 7/00; G01B 7/18
USPC ......... 73/726, 725, 734, 723, 717, 715, 753, 73/700
See application file for complete search history.

(56) References Cited

U.S. PATENT DOCUMENTS

| | | | |
|---|---|---|---|
| 3,273,400 A | * | 9/1966 | Pastan ................... G01L 9/0002 257/418 |
| 3,349,623 A | * | 10/1967 | Pastan ................... G01L 9/0002 600/488 |
| 4,843,887 A | | 7/1989 | Engeler et al. |
| 5,867,886 A | | 2/1999 | Ratell et al. |
| 6,171,253 B1 | | 1/2001 | Bullister et al. |
| 6,877,380 B2 | | 4/2005 | Lewis |
| 7,086,290 B2 | | 8/2006 | Parker et al. |
| 7,266,999 B2 | | 9/2007 | Ricks |
| 7,428,844 B2 | | 9/2008 | Mueller |
| 7,454,975 B2 | | 11/2008 | Louwagie et al. |

(Continued)

FOREIGN PATENT DOCUMENTS

| | | | |
|---|---|---|---|
| CN | 103411711 | 11/2013 | |
| DE | 102004053672 | * 5/2006 | ............ G01L 19/04 |

(Continued)

OTHER PUBLICATIONS

Notification of Transmittal of The International Search Report And The Written Opinion Of The International Searching Authority from PCT/US2017/017115, dated May 4, 2017, 17 pages.

*Primary Examiner* — Manish S Shah
*Assistant Examiner* — Nigel Plumb
(74) *Attorney, Agent, or Firm* — Westerman, Champlin & Koehler, P.A.

(57) ABSTRACT

A pressure sensor includes an elongate body which deforms in response to an applied pressure having a cavity formed therein. An isolation diaphragm seals the cavity from a process fluid and is configured to deflect in response to applied process pressure from the process fluid. An isolation fill fluid in the cavity applies pressure to the elongate body in response to deflection of the isolation diaphragm thereby causing deflection of the elongate body. A deformation sensor is coupled to the elongate body and provides a sensor output in response to deformation of the elongate body which is indicative of the process pressure.

22 Claims, 5 Drawing Sheets

(56) References Cited

U.S. PATENT DOCUMENTS

| | | |
|---|---|---|
| 7,562,580 B2 | 7/2009 | Rezgui et al. |
| 8,001,844 B2 | 8/2011 | Fricke et al. |
| 8,024,978 B2 | 9/2011 | Khemet et al. |
| 8,141,428 B2 | 3/2012 | Lohr et al. |
| 8,151,626 B2 | 4/2012 | Krafthefer et al. |
| 8,365,605 B2 | 2/2013 | Kang et al. |
| 8,453,513 B2 | 6/2013 | Bigliati et al. |
| 2005/0193836 A1 | 9/2005 | Yoshida et al. |
| 2006/0070448 A1 | 4/2006 | Baumann et al. |
| 2008/0011089 A1 | 1/2008 | Friedl |
| 2013/0264664 A1 | 10/2013 | Nimura et al. |
| 2014/0069200 A1 | 3/2014 | Yuasa et al. |

FOREIGN PATENT DOCUMENTS

| | | |
|---|---|---|
| DE | 102004053672 A1 | 5/2006 |
| DE | 10 2010 054 970 | 6/2012 |
| DE | 101 37 117 | 10/2016 |
| JP | 11-47330 | 6/1989 |
| JP | 5-13782 | 1/1993 |
| JP | 7-239282 | 9/1995 |
| RU | 2012 140 272 | 3/2014 |
| WO | 2006127726 A1 | 11/2006 |

\* cited by examiner

FLUID FILLED ELONGATE PRESSURE SENSOR

BACKGROUND

The present invention relates to pressure sensors of the type used to sense pressures of process fluid in industrial processes. More specifically, the present invention relates to pressure sensors which are filled with a fill fluid.

Industrial processes are used in the manufacture and distribution of process fluids and the like. In such industrial processes, it is known to measure various "process variables" of the process in order to monitor and/or control operation of the process. Such process variables include pressure, temperature and flow rate, among others. These process variables are measured using process variable sensors which may be implemented in what is known as a "field device" or "process variable transmitter". The process variable transmitter measures the process variable using the process variable sensor and transmits information related to measured process variable to a remote location such as a centralized control room.

Various techniques are known for measuring pressure of a process fluid. These techniques include configurations in which a pressure sensor is directly exposed to a process fluid as well as configurations in which a pressure sensor is isolated from the process fluid. However, there is an ongoing need for improved pressure measurement arrangements including those which capable of withstanding high pressures and which are resistant to large shocks or vibrations.

SUMMARY

A pressure sensor includes an elongate body which deforms in response to an applied pressure having a cavity formed therein. An isolation diaphragm seals the cavity from a process fluid and is configured to deflect in response to applied process pressure from the process fluid. An isolation fill fluid in the cavity applies pressure to the elongate body in response to deflection of the isolation diaphragm thereby causing deflection of the elongate body. A deformation sensor is coupled to the elongate body and provides a sensor output in response to deformation of the elongate body which is indicative of the process pressure.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

A pressure sensor configuration in provided in which a process pressure of an industrial process is applied to an internal cavity of an elongate body. The applied pressure causes deflection of the elongate body. A deflection sensor is coupled to the elongate body and is configured to provide an output based upon deflection of the elongate body. An isolation fill fluid isolates the elongate body from a process fluid while transferring a pressure from the process fluid to the elongate body. This configuration can be used to provide a robust design while also preventing process fluid from escaping from the industrial process.

Figure 1A:
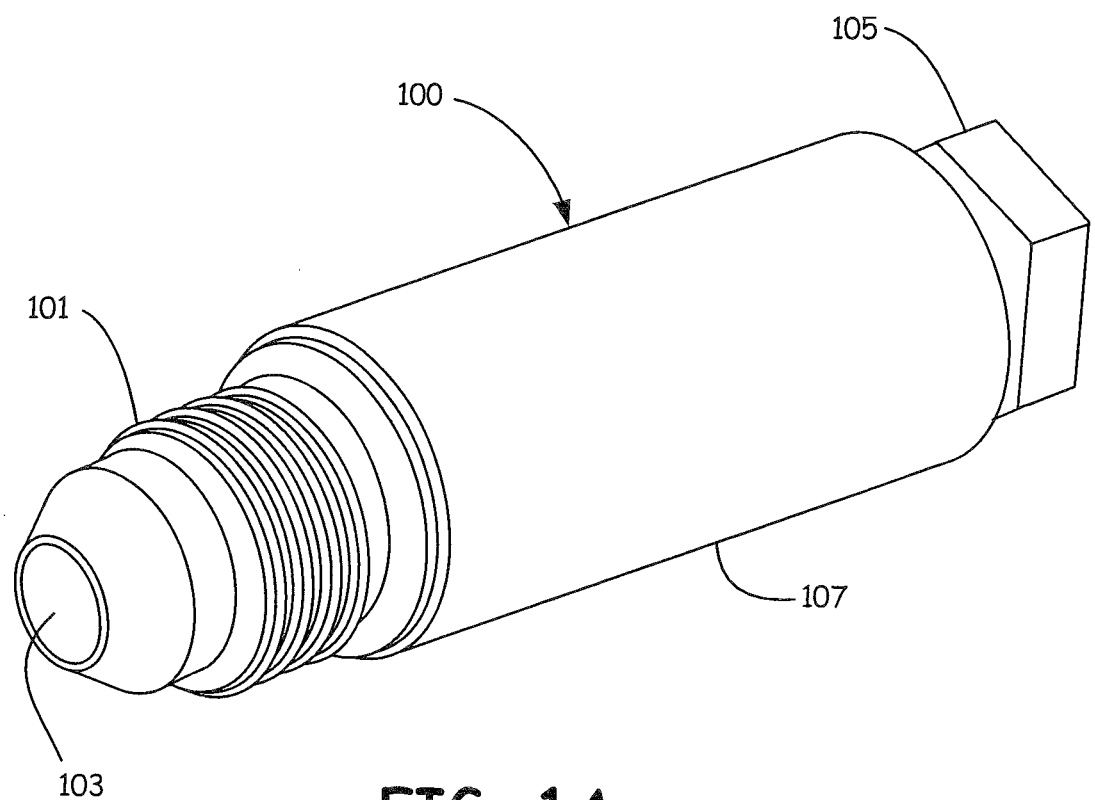
FIG. 1A is a perspective view of a prior art elongate pressure sensor.
Figure 1B:
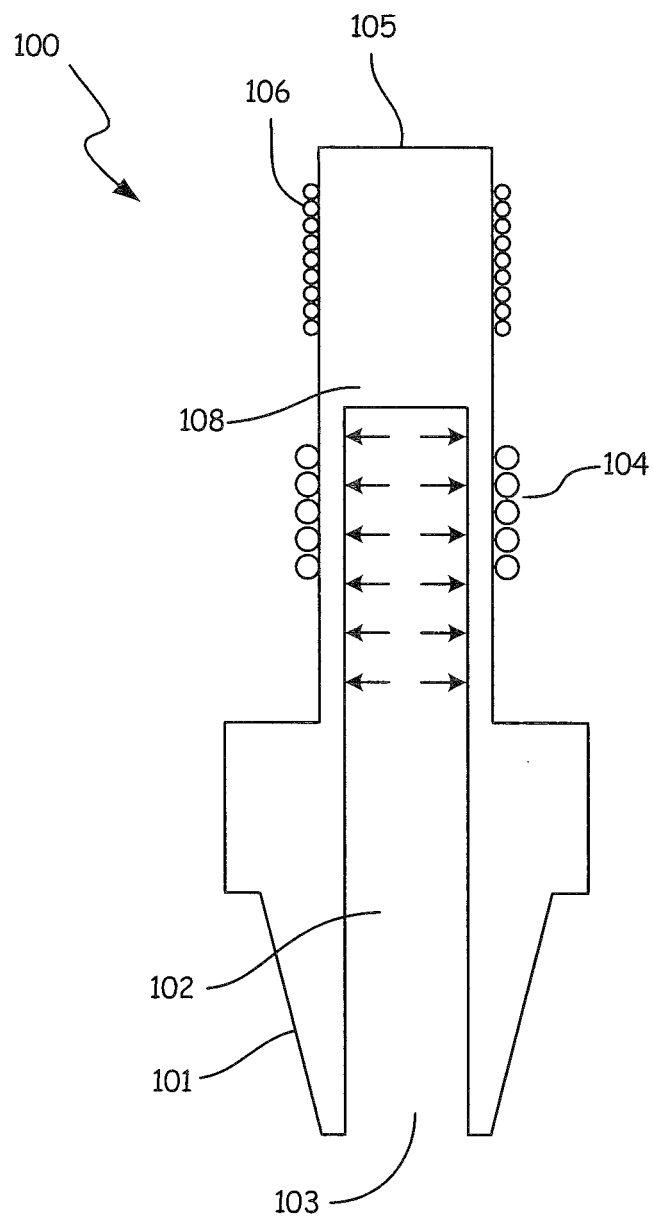
FIG. 1B is a cross-sectional view of a prior art elongate pressure sensor of FIG. 1A.

Various types of pressure sensors are known in the art. These include pressure sensors which are directly coupled to a process fluid as well as pressure sensors which are isolated from a process fluid. One type of pressure sensor which is well suited for harsh environments in which the sensor will be exposed to high pressures, as well as large vibrations and shock, is manufactured by Paine Electronics of East Wenatchee, Wash. One configuration of a Paine pressure sensor is an elongate tube 100 shown in FIG. 1A. FIG. 1B is a side cross-sectional view of the Paine pressure sensor 100. As illustrated in FIG. 1B, a process fluid is directly applied to an interior cavity 102 of the pressure sensor 100. The process fluid applies a pressure to the pressure sensor 100 through the internal cavity 102 causing deflection of the body 108 of pressure sensor 100. This deflection is illustrated by the arrows in FIG. 1B. One or more resistive elements 104 are coupled to an exterior surface 106 of the sensor 100. The resistive elements 104 have a characteristic in which their resistance changes based upon the deflection of the sensor body 108. For example, the resistor 104 may be arranged in a Wheatstone bridge whereby small deflections of the wall of the body 108 may be detected by processing circuitry. This deflection is related to the pressure applied by the process fluid. As illustrated in FIG. 1, pressure sensor 100 includes a process coupling end 101 which is threaded and is configured to be mounted to a process vessel such as a pipe. Process coupling end 101 includes a process opening 103 arranged to receive process fluid therein and couple the cavity 102 directly to the process fluid. A connector end 105 is arranged opposite the process coupling end 104 and is used for electrically coupling to the pressure sensor 100. FIG. 1A also illustrates a sensor housing 107 which extends around and covers the resistive elements 104, 106 and the sensor body 108 illustrated in FIG. 1B.

The sensor arrangement illustrated in FIGS. 1A and 1B provides a number of advantages. The pressure sensor body 108 may be fabricated as a single piece and offer extreme shock and vibration resistance. Further, the sensor 100 may be exposed to high temperatures and pressure without failing. The sensor configuration also may be implemented in a small package. However, the configuration does have some limitations including requirements that the components, process connection and materials for the sensor 100 be built into the initial design of the sensor. This increases manufacturing complexity which may cause and lead to increased lead times and/or high inventory requirements. Further, the configuration allows process fluid to enter the cavity 102 within the sensor body 108 which may lead to complications in some applications.

In one aspect, a pressure sensor is provided in which an isolation fluid is used to fill an internal cavity of an elongate body. Such a configuration provides a number of advantages. For example, the process connection and the materials used in the construction may be decoupled from the process itself. This allows a pressure sensor to be made more as a generic product in the manufacturing process thereby allowing simplification of the manufacturing steps and allowing for a more modular design. The sensor material can be optimized for the properties it provides to the sensor rather than for the compatibility with the process. Manufacturing requirements can be is limited to the sensor physical size configuration and pressure range.

Figure 2:
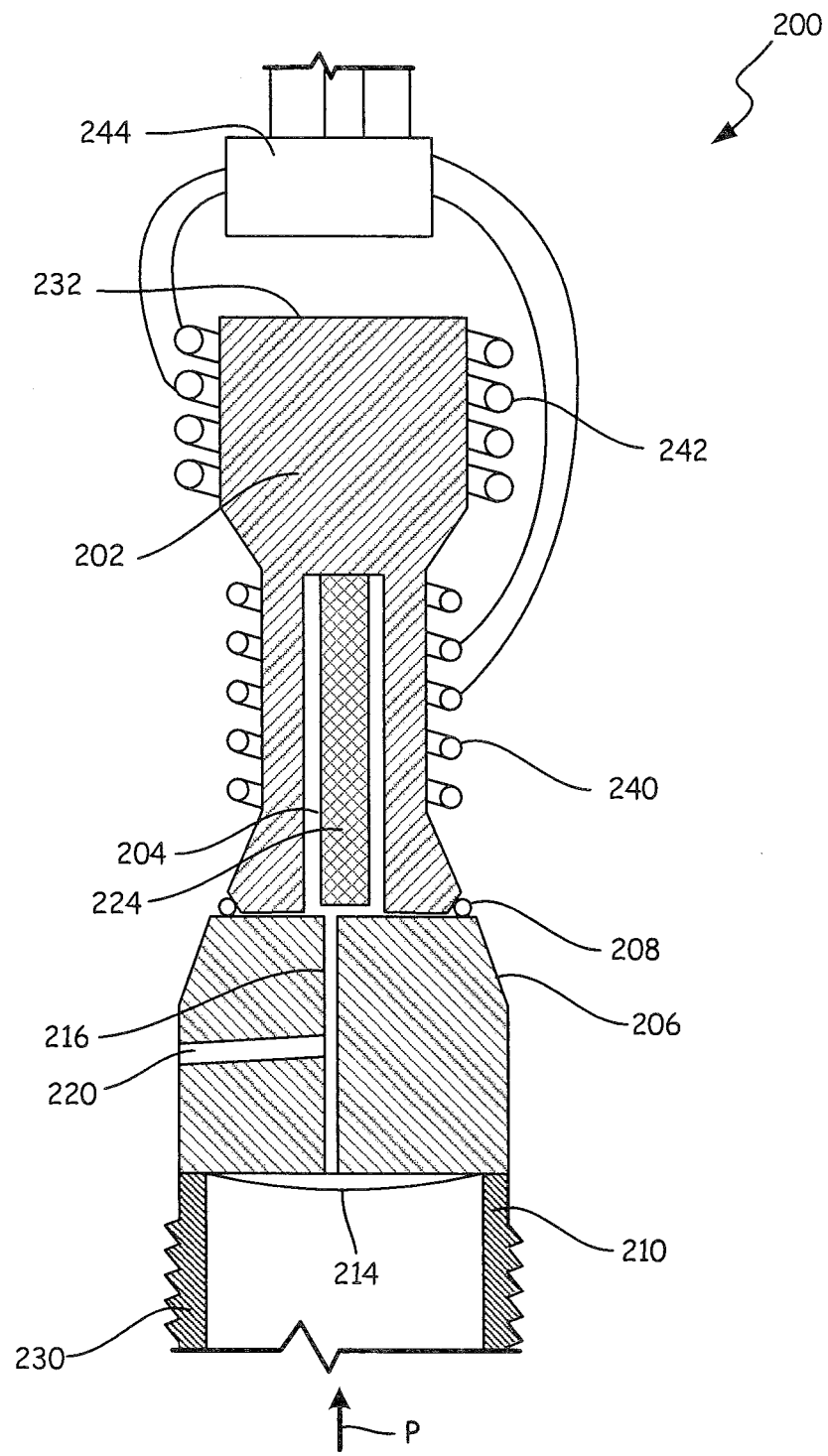
FIG. 2 is a cross-sectional view of an elongate pressure sensor in accordance with one example embodiment.

FIG. 2 is a simplified cross-sectional view of a pressure sensor 200 in accordance with one example embodiment. Pressure sensor 200 includes an elongate body 202 having a cavity 204 formed therein. Elongate body 202 is illustrated a tube having a circular cross section. However, other configurations may also be employed. Elongate body 202 is preferably coupled to a process coupling 206 by a weld 208. Process coupling 206 includes a process connector 210 which includes threads for threadably coupling to a process vessel such as a pipe or the like. Cavity 204 is fluidically coupled to an isolation diaphragm 214 through a capillary tube 216. An isolation fill fluid fills the cavity 204 and the capillary tube 216. The isolation fill fluid may comprise, for example, a substantially incompressible fluid such as oil. The capillary 216 and cavity 204 may be filled with the fill fluid through a fill fluid port 220. This port 220 may be sealed after the filling is complete. An optional thermal compensation insert 224 is placed in cavity 204 and has a thermal characteristic which compensates for thermal expansion or contraction of other components in sensor 200. For example, a ceramic material can be used which shrinks with increasing temperature to compensate for expansion of the elongate body 202. In another configuration, the insert 224 has a temperature expansion coefficient which is less than the temperature coefficient of the sensor body 202. This also provides temperature compensation. In addition to thermal compensation, the insert 224 also acts to reduce the volume of the cavity 204 and thereby reduce the amount of fill fluid required to fill the cavity 204. This also increases accuracy of pressure measurements.

As illustrated in FIG. 2, pressure sensor 200 also includes a process coupling end 230 and an electrical connection end 232. Process coupling end 230 includes threads and is configured to be threadably received by a process vessel such as process piping or the like. The elongate body 202 may be covered in a housing such as a housing 107 shown in FIG. 1A.

During operation, a pressure P is applied by a process fluid to the isolation diaphragm 214. The isolation diaphragm pushes against the isolation fill fluid in capillary 216 and cavity 204 thereby causing a pressure to be applied to the elongate body 232. This applied pressure causes deformation of the elongate body 232 proximate the cavity 204. Deformation sensor 240 comprises a strain gauge which has an electrical resistance which varies based upon an applied strain. Therefore, as the body 232 deforms, the electrical resistance of sensor 240 responsively changes. This change is indicative of the applied process pressure P. A reference sensor 242 is also illustrated in this embodiment and is coupled to a portion of the elongate body 202 which does not deform in response to the applied pressure. Sensors 240, 242 can be used in a Wheatstone bridge arrangement as discussed below.

The configuration shown in FIG. 2 in which a fill fluid is employed provides a number of advantages over the configuration shown in FIG. 1B. In a sensor which is filled with a fill fluid, the process connection and materials of construction of the sensor are not dependent on the characteristics of the process fluid. This allows a sensor to be made more as a generic product in the manufacturing process thereby allowing simplification of the manufacturing process. Further, this allows the materials used in construction of the sensor to be optimized based upon the sensor properties as opposed to based upon compatibility requirements to ensure that the materials can be used when exposed to a particular process fluid. The configuration allows manufacturing variations to be limited to the sensor physical size and pressure range. However, note that the fill fluid is preferably selected to be compatible with the expected temperature operating range of the device.

In the configuration illustrated in FIG. 2, the isolation diaphragm 214 provides a first process seal. A secondary process seal is provided by the sensor body 202 itself. Such a configuration provides a redundant seal and eliminates the requirement for an additional process pressure retaining header or connector in the device. This also simplifies manufacturing.

The diaphragm 214 need only cover the capillary tube 216 and is not required to extend across the entire face of the body 202 as illustrated in FIG. 2. The insert 224 may comprise a ceramic material to compensate for variations in the volume of the fill fluid based upon temperature. The insert 224 may comprise a rod which is placed in the center of the cavity 204. As discussed previously, the insert 224 also reduces fill fluid volume thereby increasing measurement accuracy. The configuration of FIG. 2 provides the benefits of using a fill fluid to isolate a pressure sensor while also retaining most of the benefits of the "dry" configuration illustrated in FIG. 1B.

Figure 3:
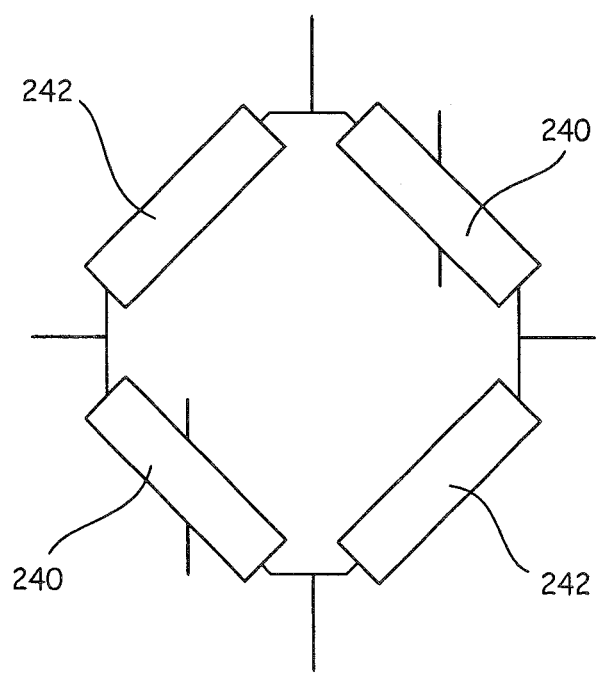
FIG. 3 is a schematic diagram illustrating a deformation sensor and a reference sensor arranged with respect to the pressure sensor of FIG. 2.

FIG. 3 is a schematic diagram of a Wheatstone bridge 250 formed with sensors 240, 242 illustrated in FIG. 2. Sensor 240 comprises two individual strain gauges which are electrical resistors which have a resistance which changes based upon applied stress. In the illustration of FIG. 2, the strain gauges 240 comprise wires which are wound around the body 202 of the sensor 200. The reference sensor 242 comprises similar strain gauges coupled to the body 202 in a region that is not responsive to the applied pressure. As illustrated in FIG. 3, the strain gauge resistances are arranged in a Wheatstone bridge configuration 250 whereby a current is applied across the Wheatstone bridge and a resultant voltage sensed across a second connection to the bridge. In such a configuration, a small change in electrical resistance can be easily detected by measurement circuitry.

Figure 4:
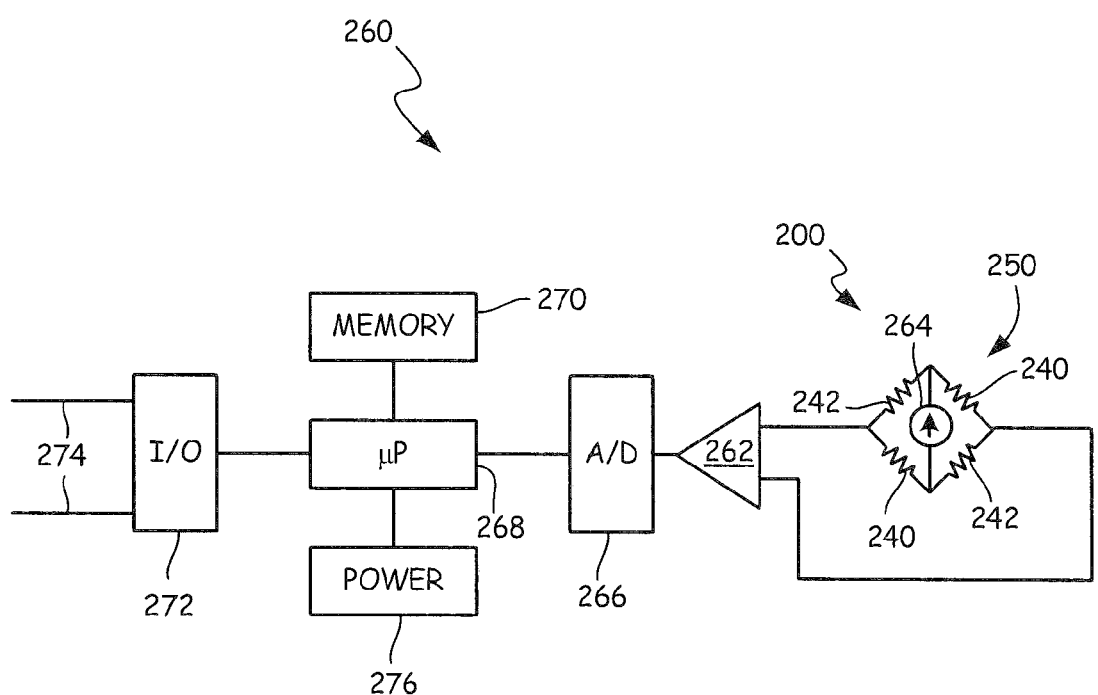
FIG. 4 is a simplified block diagram illustrating a process variable transmitter using the pressure sensor configuration of FIG. 2.

Pursuant to one embodiment, FIG. 4 is a simplified schematic diagram of a pressure transmitter 260 including the pressure sensor 200 of FIG. 2. In FIG. 4, an amplifier 262 couples across the Wheatstone bridge 250. A current source 264 is used to apply a sense current to the bridge 250. The resultant voltage sensed by amplifier 262 is amplified and provided to analog to digital converter 266 which provides a digital output to a microprocessor 268. Microprocessor 268 operates in accordance with instructions stored in memory 270. Memory 270 may also be used to store characterization or compensation information such as coefficients used for polynomial curve fitting, stored or logged data, or other information including other configuration information. Such information can be used to compensate the pressure measurements from sensor 200. The microprocessor 268 couples to an input/output circuit 272 which allows an output to be provided to the sensed pressure. The output may be provided in a wired or wireless format. Wired formats include communication over a two-wire process control loop 274. In such a configuration, the microprocessor 268 can control the current carried in loop 274 to provide a representation of the sensed pressure. The same loop 274 can be used to provide power to a power supply 276 for use in completely powering the transmitter 260. Such wired communication protocols include the HART® protocol in which a digital signal may also be modulated onto the loop 274 as well as protocols which are entirely digital. Further, the loop 274 may comprise a wireless loop. One such wireless process control loop is in accordance with the WirelessHART® communication standard as set forth in IEC 62591. However, other techniques may also be used to communicate sensed pressure information.

Although the present invention has been described with reference to preferred embodiments, workers skilled in the art will recognize that changes may be made in form and detail without departing from the spirit and scope of the invention. The configuration provides an isolation fluid filled tube type sensor. The isolation may comprise an oil or other fluid and is preferably incompressible. The sensor material may be optimized for sensor properties as opposed to process compatibility. As illustrated herein, a process connection feature is welded to a basic tube sensor. This allows the process connection to be optimized for a particular process while using a standardized sensor tube. A fill fluid port is provided for filling the sensor with the isolation fill fluid. The ceramic insert is provided to compensate for the oil volume and improves temperature performance. A connector system is provided which can be used to interface the wire windings of the sensors to an outside connector such as connector 244 shown in FIG. 2. This also can be used to provide a standardized electrical connection. A redundant seal system is provided in which the isolation diaphragm provides a first seal while the elongate body provides a secondary seal. Although in FIG. 2 the diaphragm is illustrated as being proximate to the elongate tube, in other configurations the diaphragm may be spaced apart from the elongate tube and fluidically coupled to the tube through a capillary tubing system filled with the fill fluid. Although, strain gauge sensors are specifically illustrated and discussed herein, the deformation sensor may be any type of deformation sensor and is not limited to a strain gauge having resistance which varies in response to applied stress. The material used to fabricate the process coupling 206 can be selected based upon its compatibility with the process fluid while the material used to fabricate elongate body 202 may be selected based upon its performance as a pressure sensor.

What is claimed is:

1. A pressure sensor, comprising:
    a unitary elongate body of a single piece of material which deflects in response to an applied pressure and having a cavity formed by a bore therein;
    an isolation diaphragm sealing the cavity from a process fluid and configured to deflect in response to applied process pressure from the process fluid;
    an isolation fill fluid in the cavity which applies pressure to the elongate body in response to deflection of the isolation diaphragm thereby causing deformation of the elongate body; and
    a deformation sensor coupled to the elongate body having a sensor output in response to deformation of the elongate body which is indicative of the process pressure.
2. The pressure sensor of claim 1, wherein the deformation sensor comprises a strain gauge.
3. The pressure sensor of claim 2, wherein the strain gauge is configured in a Wheatstone bridge.
4. The pressure sensor of claim 1, including a reference sensor coupled to the elongate body.
5. The pressure sensor of claim 4, wherein the reference sensor and deformation sensor are arranged in a Wheatstone bridge.
6. The pressure sensor of claim 1, including a threaded process coupling proximate the isolation diaphragm configured to couple the elongate body to a process fluid.
7. The pressure sensor of claim 1, wherein the elongate body is coupled to a process coupling.
8. The pressure sensor of claim 7, wherein the elongate body is welded to the process coupling.
9. The pressure sensor of claim 7, wherein the isolation diaphragm is mounted to the process coupling.
10. The pressure sensor of claim 7, wherein the process coupling includes a capillary carrying the fill fluid therein.
11. The pressure sensor of claim 10, wherein the process coupling includes a fill fluid port configured to receive the isolation fill fluid.
12. The pressure sensor of claim 7, wherein the process coupling is threaded.
13. The pressure sensor of claim 1, wherein the cavity includes a compensation insert.
14. The pressure sensor of claim 13, wherein the compensation insert has a thermal property to compensate for temperature changes.
15. The pressure sensor of claim 13, wherein the compensation member reduces a volume of the cavity.
16. The pressure sensor of claim 1, including an electrical connector coupled to the deformation sensor.
17. A process variable transmitter for sensing a pressure of a process fluid, comprising:
    a pressure sensor in accordance with claim 1;
    circuitry configured to provide an output related to a pressure sensed by the pressure sensor.
18. The process variable transmitter of claim 17, wherein the deformation sensor of the pressure sensor is arranged in a Wheatstone bridge.
19. The process variable transmitter of claim 18, including a current source configured to apply a current to the Wheatstone bridge and an amplifier configured to sense a resultant voltage across the Wheatstone bridge.
20. The process variable transmitter of claim 17, including a memory configured to store compensation information related to the pressure sensor.
21. The pressure sensor of claim 1, wherein the isolation diaphragm provides a first seal which seals the process fluid and elongate body provides a second seal which seals the process fluid.
22. The pressure sensor of claim 13, wherein the compensation insert comprises a ceramic.

\* \* \* \* \*